Nov. 8, 1938.   A. G. SNELL   2,136,027
FRAME OF MOLDED MATERIAL FOR AUTOMOBILE BODIES
Filed March 12, 1938
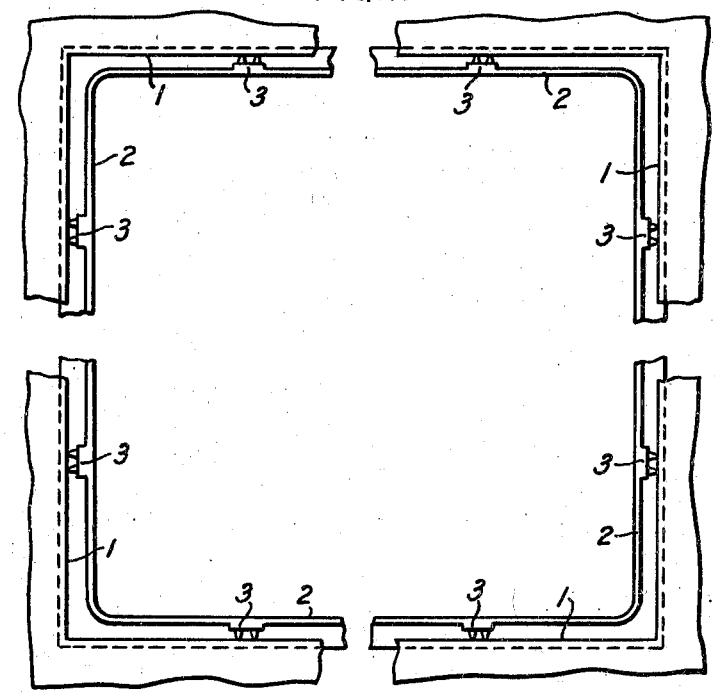

Patented Nov. 8, 1938

2,136,027

UNITED STATES PATENT OFFICE 2,136,027

FRAME OF MOLDED MATERIAL FOR AUTOMOBILE BODIES

Alfred George Snell, Sutton Coldfield, England, assignor to H. E. Ashdown (Birmingham) Limited, Liverpool, England, a British limited-liability company Application March 12, 1938, Serial No. 195,543
In Great Britain March 16, 1937

5 Claims. (Cl. 296—44)

This invention relates to frames of molded material for automobile bodies.

In automobile bodies as usually constructed, the steel members forming the structure of the sides and doors terminate at the openings for the windows, leaving unsightly edges to the openings, and these edges are usually concealed by fitting therein a frame of curved section built up of lengths of steel rolled or pressed to the desired section, and subsequently painted and varnished. Hitherto steel frames have not been pressed in a single piece, for the reason that the openings in the steel structure vary from their correct size, and therefore a steel pressing, which is necessarily of a given size, does not properly fit in the openings of all bodies.

According to the invention, a frame is made of a single plastic molding of thin curved section having at intervals on its outer surface projecting pieces of which the outer extremities are adapted to fit approximately within an opening of maximum size, the projecting pieces, for a length from their extremities equal to the limits of tolerance, being of small area in cross section so that they can easily be reduced in height to the extent required to fit the frame within the opening. Preferably, the projecting pieces have a cross-sectional area increasing from their extremities towards the curved section, so that they can be reduced in height to the extent required to fit the opening by the operation of pressing the frame into the aperture.

In the accompanying drawing:—

Figure 1 is a view, partly broken away, of the body round the opening with the frame in place, seen from the outside, the frame being inserted from the inside;

Figure 2 is a similar view of a portion of the frame on an enlarged scale;

Figure 3 is a section along the line A—A of Figure 2;

Figure 4 is a similar section showing an alternative form of projection;

Figure 5 is a view of a portion of Figure 1 on an enlarged scale, and

Figure 6 is a section of the steel rolling from which the frames are usually built.

Referring to the drawing, 1 is the edge of the opening in the body and 2 is a frame fitted within it. The frame usually employed is built up from lengths of a steel rolling which is shown in section in Figure 6. In this, the curved outer surface 9 is the portion exposed to the interior of the body and the portions 4 are adapted to fit within the edge 1 of the opening. The frame according to the invention is a single plastic molding 2 having a thin curved section shown by the curved full and dotted lines in Figure 3.

In the preferred form of frame, outwardly projecting pieces are molded on the frame at intervals, consisting of bases 3, on the outer surfaces 4 of which are V-ridges 5. If the correct size of the opening is as shown by the edge 1 in Figure 5, and if the constructional limits of tolerance are as indicated by the dotted lines 6 and 7, the height of the ridges 5 is made such that their outer ends reach or just pass the limit 7, while the surfaces 4 are able to enter within the smallest size of opening, as indicated by the line 6. The ridges 5 are made of small cross-sectional area, increasing from their extremities towards the curved section, as seen in Figures 2 and 5, so that the frame can be fitted into the opening by removing the portions which extend beyond the edge 1 (shown in dotted lines in Figure 5), either by a rasp or other tool, or by pressing the frame into the opening so as to shear off the said portions.

The average cross-sectional area of the V-ridges, or of the projecting pieces within the limits of tolerance, measured at right angles to the plane of the frame, that is to say, through the line 1 of Figure 5, should be less than one twenty fifth of the projected area of the periphery of the frame, that is to say, the area as seen when looking at Figure 3 from the right hand side.

In the case of frames adapted to be fitted by pressing them into the opening, the total width of the projections along the line of shear and also the width of each individual projection must be restricted. By way of a guide, it has been found that a frame of average size having V-ridges as shown, can easily be pressed into position when the width of each ridge at its base is 0.08 inch and the total width of all the ridges is one-nineteenth of the periphery of the frame.

When the frame is in place in the opening it is fixed in place by screws through the holes 8 in the portions 3. Preferably these holes are formed between two projections 5, so that pressure is applied by the screws between lines along which the frame abuts against the edge 1 of the aperture.

Instead of being small ridges on a base 3, the projecting pieces may be ridges on the curved section, or they may be knobs or cones on a base, but, when the frame is adapted to be fitted by pressing it into the opening, the projecting pieces must increase in sectional area from their extremities towards the curved section so that they are not liable to break at any points other than those at which the shearing pressure is applied.

To facilitate entry of the frame into the opening the ridges 5 may increase in height from the side of entry of the frame, as shown in Figure 4, their height at the side of entry being less than is required to fit within the maximum size of opening.

Having described my invention, I declare that what I claim and desire to secure by Letters Patent is:—

1. Frame for the opening in an automobile body of which the dimensions may vary within constructional limits of tolerance, consisting of a single plastic molding of thin curved section having at intervals on its outer surface projecting pieces of which the outer extremities are adapted to fit approximately within an opening of maximum size, the projecting pieces having, within the limits of tolerance, an average cross-sectional area measured at right angles to the plane of the frame which is less than one twenty-fifth of the projected area of the periphery of the frame.

2. Frame for the opening in an automobile body of which the dimensions may vary within constructional limits of tolerance, consisting of a single plastic molding of thin curved section having at intervals on its outer surface projecting pieces of which the outer extremities are adapted to fit approximately within an opening of maximum size, the cross-sectional area measured at right angles to the plan of the frame of the projecting pieces increasing from their extremities towards the curved section, and having an average value, within the limits of tolerance, which is less than one twenty-fifth of the projected area of the periphery of the frame.

3. Frame for the opening in an automobile body of which the dimensions may vary within constructional limits of tolerance, consisting of a single plastic molding of thin curved section having at intervals on its outer surface projecting pieces of which the outer extremities are adapted to fit approximately within an opening of maximum size, the cross-sectional area measured at right angles to the plane of the frame of the projecting pieces increasing from their extremities towards the curved section, and having an average value, within the limits of tolerance, which is less than one twenty-fifth of the projected area of the periphery of the frame, the maximum width of each projecting piece, within the limits of tolerance, being not greater than one tenth of an inch.

4. Frame for the opening in an automobile body of which the dimensions may vary within constructional limits of tolerance, consisting of a single plastic molding of thin curved section having at intervals on its outer surface projecting pieces in the form of V-ridges on bases, the outer extremities of the V-ridges being adapted to fit approximately within an opening of maximum size and the dimensions of the frame measured over the bases being not greater than the minimum size of opening, the V-ridges having within the limits of tolerance, an average cross-sectional area measured at right angles to the plane of the frame which is less than one twenty-fifth of the projected area of the periphery of the frame.

5. Frame as in claim 4, each base having two V-ridges, and a hole for a fastening screw between the two ridges.

ALFRED GEORGE SNELL.